US005890184A

United States Patent [19]

Ooishi

[11] Patent Number: 5,890,184

[45] Date of Patent: Mar. 30, 1999

[54] EXTERNAL CHARACTER MANAGEMENT APPARATUS

[75] Inventor: Isamu Ooishi, Shizuoka, Japan

[73] Assignee: Fujitsu Limited, Kawasaki, Japan

[21] Appl. No.: 728,864

[22] Filed: Oct. 10, 1996

[30] Foreign Application Priority Data

May 16, 1996 [JP] Japan .................................... 8-121218

[51] Int. Cl.[6] ...................................................... G06T 1/00

[52] U.S. Cl. ........................... 707/542; 707/530; 707/535

[58] Field of Search .................................... 707/542, 535, 707/523, 530, 531

[56] References Cited

U.S. PATENT DOCUMENTS 5,617,314 4/1997 Zhong ..................................... 707/540
5,659,772 8/1997 Oyamada et al. ...................... 707/535

FOREIGN PATENT DOCUMENTS 7-271777 10/1995 Japan .

OTHER PUBLICATIONS

"Irma for the Mainframe for Macintosh (v. 4.0)"; Communications Software, Computer–to–Computer Links; p(1), Jan. 1995.

*Primary Examiner*—Joseph H. Feild
*Assistant Examiner*—Motilewa Good-Johnson
*Attorney, Agent, or Firm*—Staas & Halsey

[57] ABSTRACT

An external character management apparatus is provided for collectively managing external characters in a distributed system which is constituted by multiple platforms using different code systems. A desired code system is set in advance as an external character management code system. When external characters in a distributor's external character file are recorded by external character recording means or external characters stored in external character management file storing means are fetched by external character fetching means, code converting means converts the external character codes to corresponding codes of an external character management file or of a distribute's system in accordance with a character code conversion table if the code system of the distributor's system or distribute's system differs from the external character management code system, and stores the converted external characters in the external character management file storing means or in a distributee's external character file. External character transforming means performs conversion of data format or size with the aid of data format converting means and records the converted data in the external character management file storing means, and external character editing means permits editing of an external character management file stored in the external character management file storing means.

7 Claims, 9 Drawing Sheets

EXTERNAL CHARACTER MANAGEMENT APPARATUS

BACKGROUND OF THE INVENTION

1. Field of the Invention

The present invention relates to an external character management apparatus, and more particularly, to an external character management apparatus for collectively managing external characters of multiple platforms using different code systems.

2. Description of the Related Art

Conventionally, there has been a distributed system in which a plurality of information processing apparatus operating on different platforms are interconnected via a network, and in the existing circumstances, different platforms in such a distributed system use respective different character code systems. Large computers use, for example, JEF (Japanese processing Extended Feature) code system, workstations such as UNIX (registered trademark used in the U.S.A. and other countries under license of X/Open Co., Ltd.) machines use EUC (extended UNIX code) system, and in personal computers, Shift JIS code system is dominant. The difference between these code systems lies in how characters, which are each represented by a 1-, 2- or 3-byte character code, are assigned their character codes. In all cases, the code system has a JIS area including standardized character sets such as a non-Kanji (non-Chinese character) set, a JIS level-1 Kanji set and a JIS level-2 Kanji set. However, in the case where customers' information is to be managed by a company or information about the names of people is to be managed by a government, there naturally exist a large number of characters that are outside the coverage of the standardized character sets. For such characters and non-standardized characters or graphics such as corporate logos, an external character area is prepared to permit users to freely define and record external characters for later use, and by using the external characters defined with respect to individual platforms, non-JIS Kanji characters and logotypes can be displayed and printed on platforms using different code systems.

In the case of characters of the standardized character sets, each of the code systems has systematic correspondences between characters and their character codes; therefore, as far as the standardized character sets are used, characters may be subjected to code conversion in accordance with a predetermined conversion rule so that they can be used in common by different systems. For external characters, on the other hand, if a distributed system is constructed by a plurality of platforms using different code systems, external characters defined with respect to one code system must be defined in a similar manner with respect to all code systems used in the distributed system. Therefore, in the case where a new external character is created somewhere in the distributed system, its character code can be used directly insofar as the code system used is the same. For a system using a different code system, however, an external character corresponding to the created one must be recorded in the external character area allocated to this system, and moreover, to actually use the recorded external character, it must be subjected to code conversion.

In a conventional system such as the system disclosed in Unexamined Japanese Patent Publication (KOKAI) No. 7-271777, for example, when a character string is to be sent from one platform to another using a different code system, character patterns are read from a font file, code conversion from the character codes assigned to these character patterns to character codes for the receiving side is carried out by means of a code conversion table, and the converted character codes are sent. Accordingly, external characters can be used consistently among platforms using different code systems.

Conventionally, external characters prepared taking account of use on multiple platforms using different code systems have been distributed, and also code conversion of such external characters is performed. However, character patterns for display or printing are converted mechanically in accordance with the format and size of the code system which a distributee's system uses; generally, therefore, the quality of characters after the conversion is poor. For example, when dot-matrix character patterns are converted from one size to another, bits are mechanically added or reduced to change the size, and therefore, in some cases, extraordinary patterns result from the conversion depending on the character pattern. Accordingly, the distributee is required to check the quality of converted characters, which means that in each of distributees' systems, external characters after the conversion must be printed or displayed to determine their quality.

If, as a result of the trial printing or display of converted external characters on a distributee's system, it is found that some external characters need reshaping, an external character editor of the system must be started to reshape such external characters by means of the editor. Since the method of operating external character editors differs from system to system, a person in charge of managing external characters must master operating the external character editors of all systems.

According to the conventional procedure, therefore, no particular problem arises in the case where external characters are introduced collectively when systems are installed, but where external characters are newly added in existing systems, all systems must be taken care of, even if only several characters are added, presenting a problem that a change in the operational environment cannot be efficiently coped with.

SUMMARY OF THE INVENTION

An object of the present invention is to provide an external character management apparatus which eliminates the need to master operating external character editors of currently used systems and which also permits external characters of all systems to be collectively managed at a single location.

To achieve the above object, there is provided an external character management apparatus connected to a distributed system via a network, the distributed system including a plurality of computer systems interconnected via the network and using different sizes of characters and different character codes assigned to respective characters. The external character management apparatus comprises external character recording means for reading an external character stored in a distributor's external character file and recording the external character, external character management file storing means for storing in an external character management file the external character recorded by the external character recording means, external character fetching means for fetching an external character stored in the external character management file storing means and storing the fetched external character in a distributee's external character file, code converting means, having a character code conversion table and associated with the external character recording means or the external character fetching means, for performing conversion of an external character code in accordance with the character code conversion table when a different code system is used in a distributor's system or distributee's system, code conversion table updating means for updating the character code conversion table in accordance with a code system for management, external character transforming means for fetching an external character stored in the external character management file storing means, converting the fetched external character to an external character of a different data format or different size, and storing the converted external character in the external character management file storing means, data format converting means for performing the conversion of data format or size of the external character when transformation process is executed by the external character transforming means, and external character editing means for editing an external character recorded in the external character management file storing means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
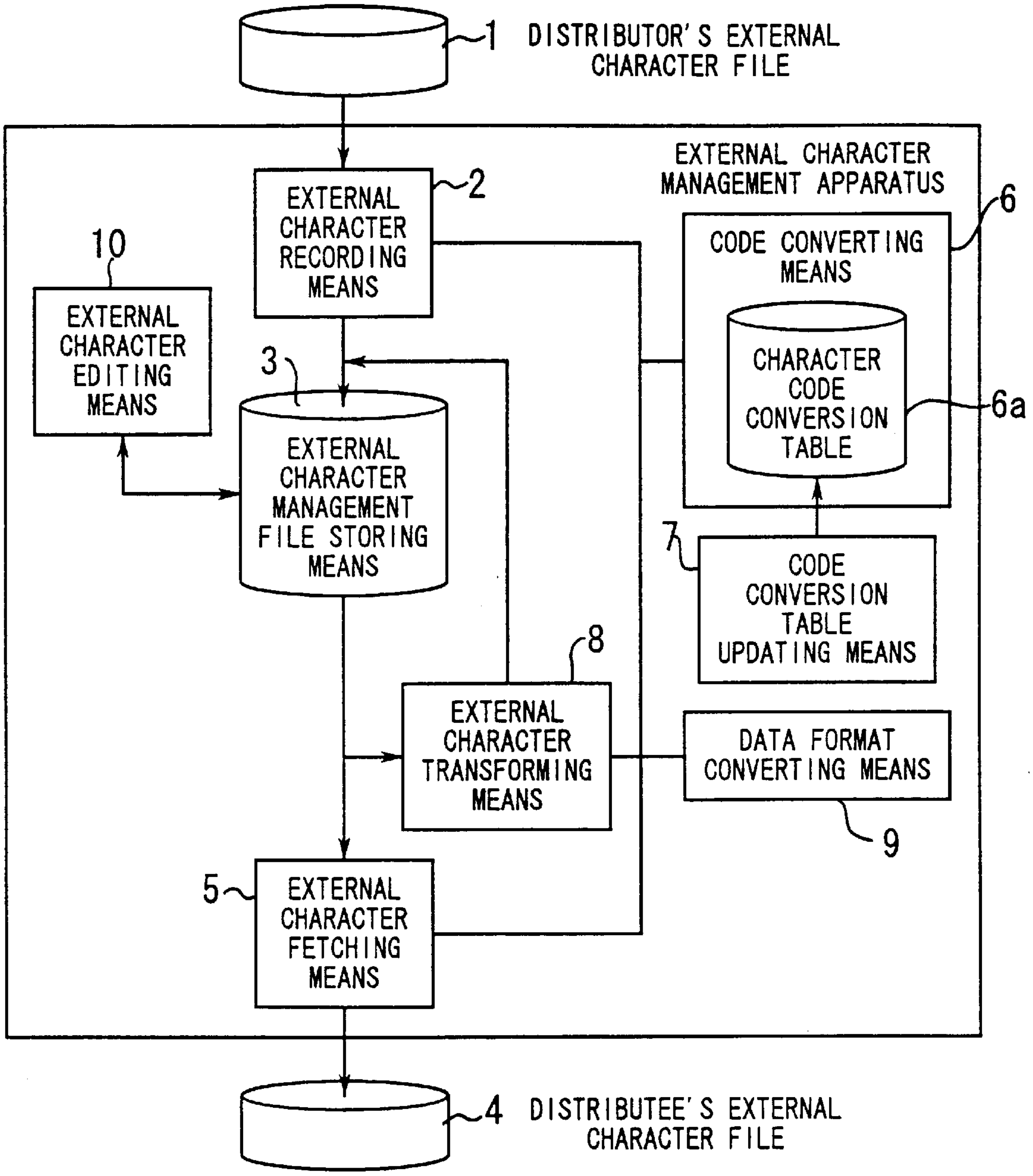
FIG. 1 is a diagram illustrating a theoretical configuration of an external character management apparatus according to the present invention.

First, an outline of the present invention will be explained with reference to the drawing.

FIG. 1 is a diagram illustrating a theoretical configuration of an external character management apparatus according to the present invention.

The external character management apparatus of the present invention is used especially in a distributed system environment wherein a plurality of computer systems, which use different sizes of characters and different character codes assigned to respective characters, are interconnected via a network. The external character management apparatus comprises external character recording means 2 for reading external characters stored in a distributor's external character file 1 distributed on a network or as a storage medium and for recording the external characters; external character management file storing means 3 for storing in an external character management file the external characters recorded by the external character recording means 2; external character fetching means 5 for fetching external characters stored in an external character management file and storing the fetched external characters in a distributee's external character file 4; code converting means 6, having a character code conversion table 6*a*, for carrying out conversion of external character codes in accordance with the character code conversion table 6*a* when the conversion is requested by the external character recording means 2 or the external character fetching means 5; code conversion table updating means 7 for updating the character code conversion table 6*a*; external character transforming means 8 for converting external characters stored in an external character management file to external characters of different data format or different size and recording the converted external characters in a separate external character management file; data format converting means 9 for carrying out conversion of the data format or size when a transformation process is executed by the external character transforming means 8; and external character editing means 10 for editing an external character recorded in the external character management file storing means 3.

In the external character management apparatus with the aforementioned configuration, when external characters are recorded by the external character recording means 2, the distributor's external character file 1 is analyzed to determine the external character management code system of a distributor's system. If the external character management code system of the distributor's external character file 1 differs from that of the external character management files stored in the external character management file storing means 3, external character codes of the distributor's external character file 1 are converted to corresponding codes of the external character management file by the code converting means 6, and the converted external character codes are stored in a new external character management file, which is then recorded in the external character management file storing means 3.

When external characters are fetched from an external character management file to the distributee's external character file 4 by the external character fetching means 5, first, the external character management code system of the external character management file is checked against that of the distributee's external character file 4. If the external character management code system of the sending side differs from that of the receiving side, external character codes of the external character management file are converted to corresponding codes of the distributee's external character file 4 by the code converting means 6, and the converted external character codes are stored in the distributee's external character file 4.

In the case where a code system is added to be used within the distributed system, for example, the code conversion table updating means 7 adds a correlation table for correlating character codes of the added code system with those of a code system already under management, for the character code conversion table 6*a* which the code converting means 6 has.

When external characters of an external character management file recorded in the external character management file storing means 3 are transformed by the external character transforming means 8 to external characters of different data format or size to be stored in a separate external character management file, the individual files are checked to determine their data format and character size of external characters. External character data fetched from the external character management file storing means 3 is converted to external character data of required data format or character size by the data format converting means 9, and the converted data is stored as a separate external character management file, which is then recorded in the external character management file storing means 3.

The external character editing means 10 is provided with an external character editor capable of handling a plurality of different data formats. When an external character recorded in the external character management file storing means 3 is to be edited, the external character editing means 10 checks the external character management file storing the external character in question to determine the data format and character size, starts the external character editor under the determined conditions to permit reshaping or modification of the external character as needed, and finally stores the edited external character in the original external character management file.

An embodiment according to the present invention will be now described wherein the embodiment is applied, by way of example, to a distributed system including a plurality of computer systems interconnected via a network.

Figure 2:
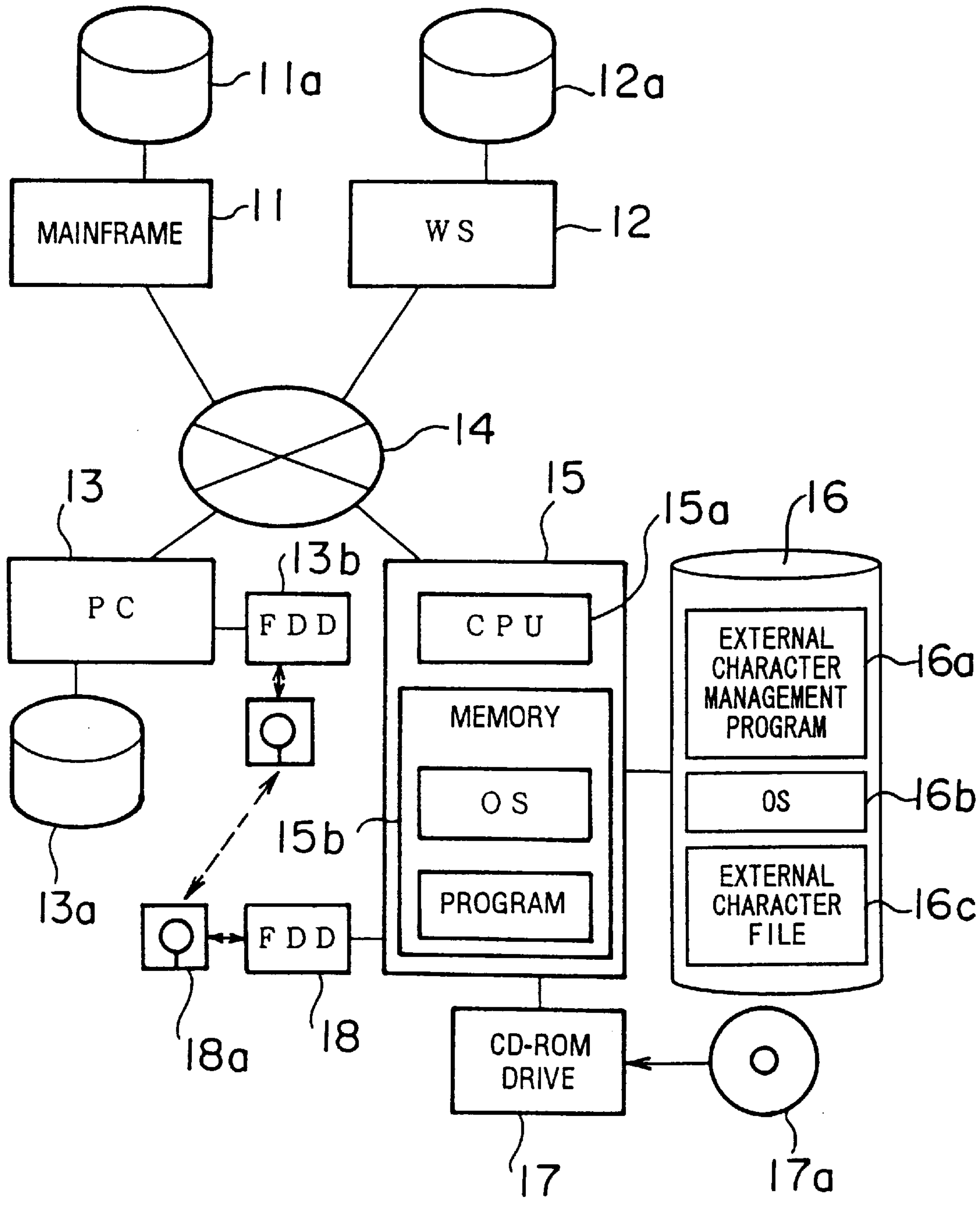
FIG. 2 is a diagram showing, by way of example, a configuration of a distributed system.

FIG. 2 is a diagram showing an example of a configuration of such a distributed system.

The distributed system shown in FIG. 2 comprises, for example, a mainframe 11,aworkstation (WS) 12 and a personal computer (PC) 13 interconnected via a network 14. The mainframe 11 has a character code management section 11*a* connected thereto, which uses, for example, JEF code as its character code system. The workstation 12 also has a character code management section 12*a* connected thereto, which uses, for example, EUC code as its character code system. To the personal computer 13 are connected a character code management section 13*a* and a floppy disk drive (FDD) 13b, and the character code management section 13*a* uses Shift JIS code as its character code system, for example. Further, a general-purpose computer 15 is connected to the network 14. The general-purpose computer 15 has a central processing unit (CPU) 15*a* and a memory 15*b* and is connected to external storage devices including a hard disk 16, a CD-ROM drive 17 and a floppy disk drive (FDD) 18, thus constituting an external character management apparatus.

An external character management program for managing external characters is at first stored on a distributed storage medium such as a CD-ROM 17*a* or a floppy disk 18*a*. Assuming that the external character management program is stored on the CD-ROM 17*a*, for example, it is read from the CD-ROM 17*a* and installed on the hard disk 16 so as to be available as an external character management program 16*a*. The hard disk 16 additionally stores an operating system (OS) 16*b* and an external character file 16*c*.

The external character management program 16*a* installed on the hard disk 16 is loaded in part or in its entirety as needed into the memory 15*b* of the general-purpose computer 15 and executed. This external character management program 16*a* is under the control of the operating system 16*b*, and functions (programs) offered by the operating system are called and executed as needed.

The external characters of various character code systems used in this distributed system, that is, the external characters of JEF code system, EUC code system and Shift JIS code system, are collectively managed by the external character management program 16*a*. The external character management program 16*a* is capable of recording, fetching, transforming and editing external characters. In this case, a desired code system that is considered to be effective for the management by the external character management apparatus is determined in advance by the user as a management code system. In the description to follow, it is assumed that JEF code system is set as the management code system for the external character management apparatus. Recording or fetching of external characters can be requested not only from the general-purpose computer 15 as the external character management apparatus but also from the terminals of the distributed system, such as from the workstation 12, via the network. Distribution of external characters in this case is carried out in the form of a storage medium such as a CD-ROM 17*a*, a floppy disk 18*a* or a semiconductor memory, not shown, or via the network 14. In the illustrated example of FIG. 2, a distributor's external character file is supplied as a CD-ROM 17*a* or a floppy disk 18*a*. In the case of storing external characters on a floppy disk 18*a*, the external characters which have been fetched from the external character management apparatus and of which the data contents have been verified are stored, for example, in the character code management section 13*a* via the floppy disk drive 13*b* of the personal computer 13.

The following describes an outline of a process carried out by the external character management apparatus when the external character management program 16*a* loaded in the memory 15*b* of the general-purpose computer 15 is executed by the central processing unit 15*a*.

Figure 3:
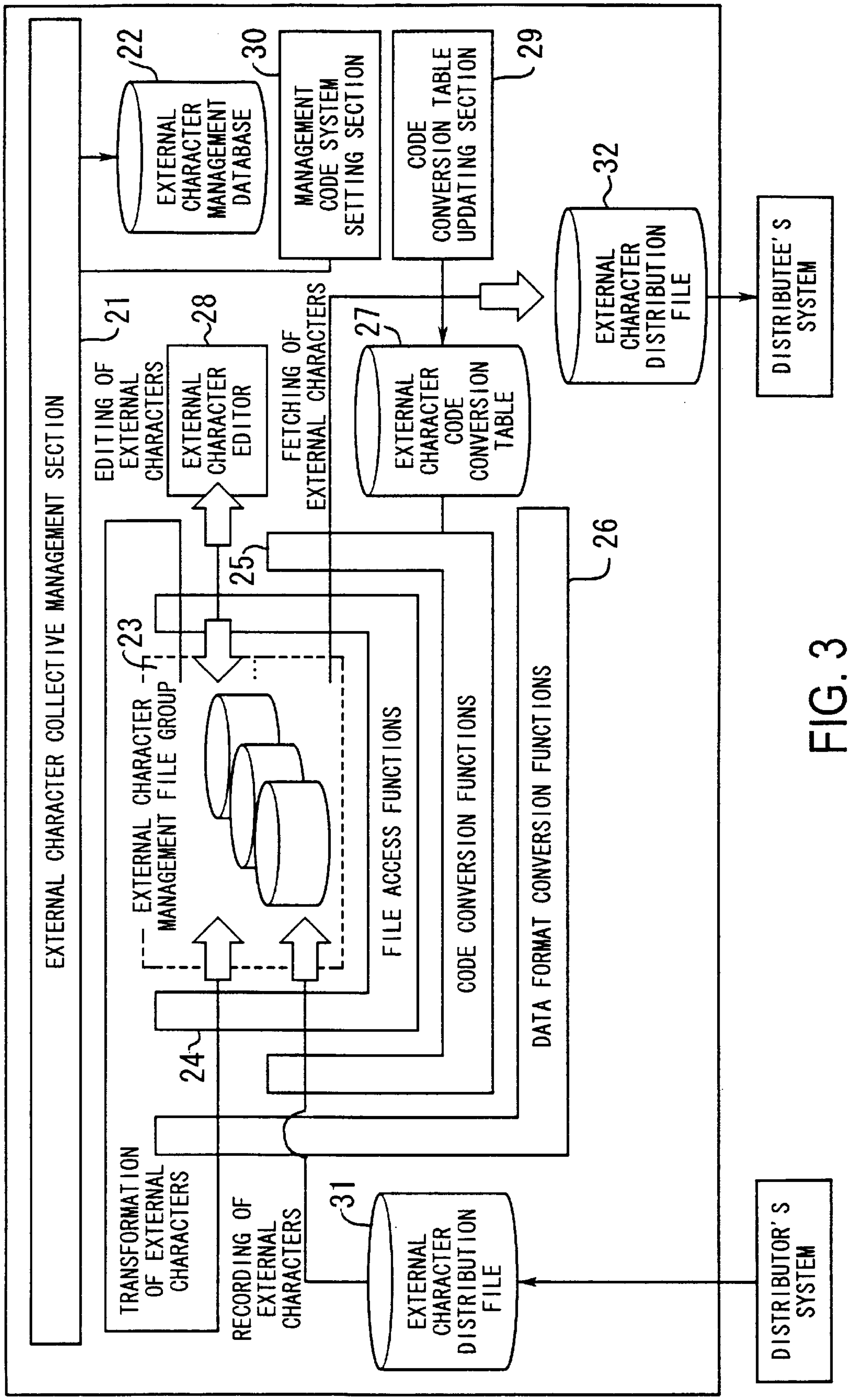
FIG. 3 is a diagram illustrating an outline of processing by the external character management apparatus.

FIG. 3 is a diagram showing an outline of the process performed by the external character management apparatus.

The external character management apparatus comprises an external character collective management section 21, an external character management database 22, an external character management file group 23, file access functions 24 encompassing the external character management file group 23, code conversion functions 25 and data format conversion functions 26, an external character code conversion table 27 connected to the code conversion functions 25, an external character editor 28 capable of handling a plurality of different data formats, a code conversion table updating section 29 for updating conversion tables of the external character code conversion table 27, and a management code system setting section 30.

The external character collective management section 21, which is a section for controlling the whole external character management apparatus, manages the external character management file group 23 through the external character management database 22, and controls the recording, fetching, transforming and editing of external characters, the updating of the external character code conversion table 27 by the code conversion table updating section 29, and the setting of the management code system for the external character management apparatus by the management code system setting section 30. The file access functions 24 serve to open, close, read, and write an external character management file of the external character management file group 23. The code conversion functions 25 perform code conversion from a code system other than JEF code, which is the management code system, to JEF code, or from JEF code to a target character code system in accordance with the external character code conversion table 27 when conversion of external character codes between different code systems is necessary to record or fetch external characters. The data format conversion functions 26 perform conversion between data formats when external characters are transformed.

The external character management file group 23 is made up of multiple external character management files which have been created for individual typefaces of characters such as Mincho and Gothic, for example, for individual data formats such as dot-matrix, vector and TrueType and for individual character sizes. When external characters under management of the external character management apparatus are presented to the user through a monitor, not shown, the external character collective management section 21 displays the external characters by means of a tree structure whereby the external characters are classified according to typefaces, formats and sizes. The external character editor 28 can handle any of data formats including dot-matrix, vector and TrueType, for example, and has the function to convert data between different data formats. Accordingly, the user can edit an external character without taking any notice of what the data format is. In the case of editing an external character of vector format, for example, the external character can be edited in the dot-matrix format, in which case, when the editing is completed, the edited external character is converted to vector format and is saved in the corresponding external character management file.

When external characters are recorded, the external character management apparatus performs a sequence of processes which includes the reading of an external character distribution file 31 supplied from a distributor's system, the conversion of external character codes to JEF code by means of the code conversion functions 25 if the code system used in the distributor's system is not JEF code, and the writing of an external character management file by means of the file access functions 24, thereby recording the external characters.

When recorded external characters are fetched, a source external character management file is read by means of the file access functions 24, the external character codes are converted from JEF code to a target character code system by means of the code conversion functions 25 if the target code system is not JEF code, and the external characters are saved as an external character distribution file 32, which is then delivered to or transferred via network to a distributee's system. Since, in this case, completed characters whose typeface, size and data format have been verified are simply fetched, no data format conversion is carried out.

When recorded external characters are transformed to external characters of different data format or size, an external character management file as a source of transformation is read by means of the file access functions 24, and conversion to a target data format is performed by means of the data format conversion functions 26. In this case, since the same JEF code is used, no code conversion is carried out, and the external characters are written in the target data format by means of the file access functions 24. When such transformation of external characters is instructed by the user, the external character management file group 23 is displayed in the form of trees on the monitor screen in such a manner that the external characters already recorded can be distinguished from potential external characters to be recorded, and a character string indicative of recorded external characters is dragged and dropped on a character string indicative of potential external characters by means of a pointing device such as a mouse, whereupon the external characters start to be transformed.

The external character editor 28 reads a recorded external character management file by means of the file access functions 24 to allow external characters to be edited. Upon completion of editing, the editor 28 writes the results of editing in the original external character management file by means of the file access functions 24. The external character editor 28 can be started in the following manner. First, while the external character management file group 23 is displayed in the form of trees on the monitor screen, a character string indicative of a recorded external character size is double-clicked with the pointing device, whereby a list of external characters with the specified size is displayed. Then, a target external character in the list is double-clicked, whereupon the external character editor 28 starts.

A sequence of processes performed by the external character management apparatus, which includes recording, fetching, transforming and editing of external characters, will be now described in detail.

Figure 4:
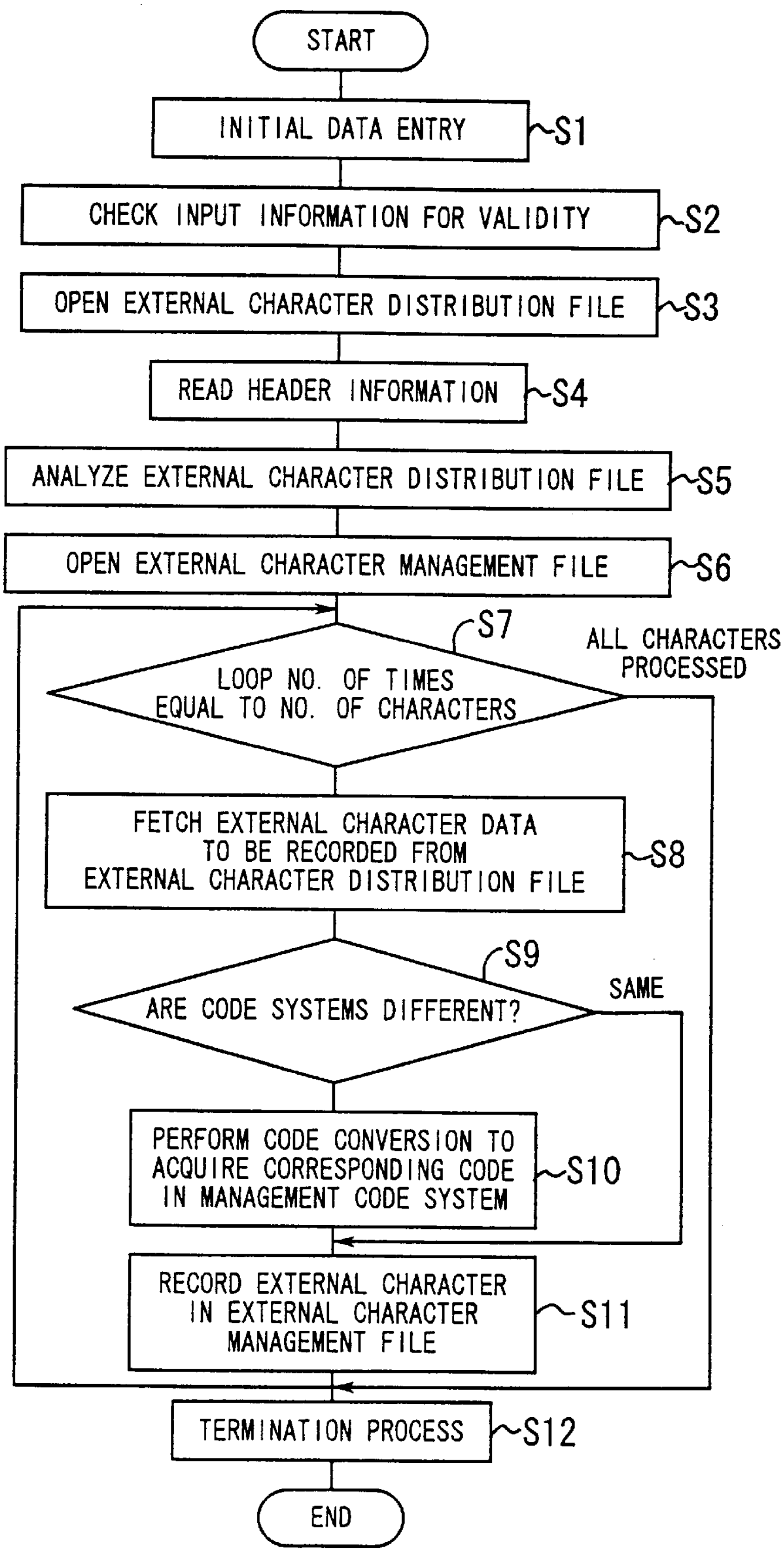
FIG. 4 is a flowchart showing a process flow at the time of recording external characters.

FIG. 4 is a flowchart showing a process flow at the time of recording external characters.

When external characters of an external character distribution file are recorded as an external character management file, first, initial data entry for recording external characters is performed (Step S1). The initial data entry is carried out in one of two ways, depending on whether recording of external characters is requested directly by the external character management apparatus or by some other system via the network. At the time of initial data entry, the name of a file in which external characters to be recorded are stored, that is, the name of an external character distribution file, and recordation target information are specified as input information. As the recordation target information, the typeface, size and data format to be recorded are specified. In the case where no recordation target information is specified, default information included in the file is specified. Subsequently, the information input as the initial data entry is checked for validity, for example, a determination is made as to whether the input information is correct or not (Step S2), then the external character distribution file is opened (Step S3), and header information of the external character distribution file is read (Step S4). The header information thus read is analyzed to determine the number of distributed characters, the code system used in the distributor's system, and the data format and size of the external characters (Step S5). Then, the external character management file specified by the recordation target information at the time of initial data entry is opened (Step S6).

Subsequently, a loop process is executed to determine whether or not looping has taken place a number of times equal to the number of distributed characters (Step S7). Since the number of distributed characters is known as a result of the analysis of the header information, it is determined whether or not the loop process has been executed the number of times equal to the known number of distributed characters. When the loop process has not yet been executed the number of times equal to the number of characters, external character data to be recorded is fetched character by character from the external character distribution file (Step S8).

It is then determined whether or not the code system of the external character distribution file differs from the management code system of the external character management file to be recorded (Step S9). If the code system of the external character distribution file differs from the management code system of the external character management file, code conversion is performed to acquire a corresponding code in the management code system (Step 10); on the other hand, if the two code systems are the same, the code of the external character distribution file is used as it is. For example, if the management code system is JEF code system whereas the code system of the external character distribution file is EUC system, codes of EUC system are converted to corresponding codes of JEF code system. The external character is then recorded in the external character management file (Step S11). When the process from Step S7 through to Step S11 has been repeated the number of times equal to the number of characters, a termination process, such as closing of the files, is executed (Step S12).

Figure 5:
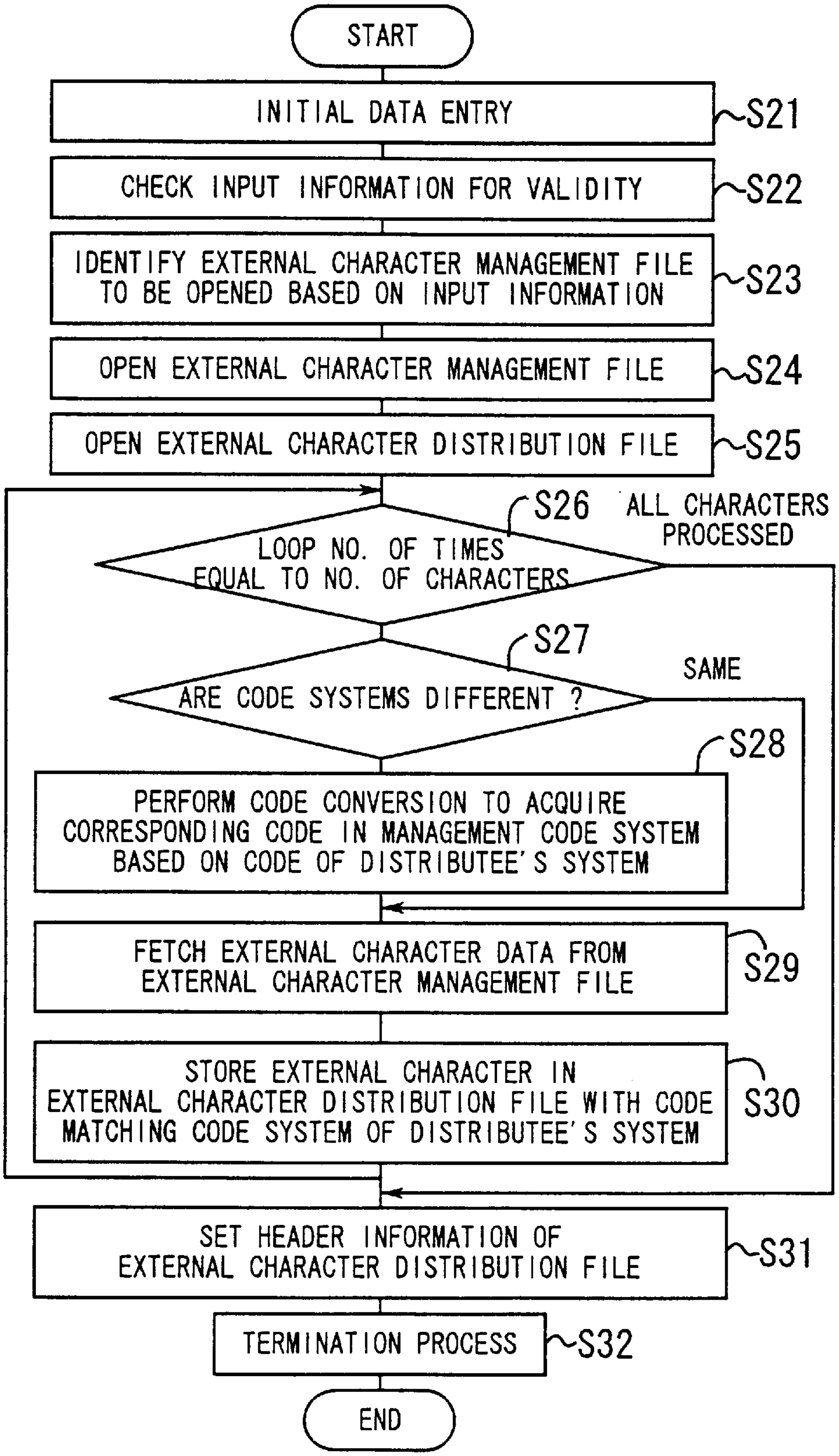
FIG. 5 is a flowchart showing a process flow at the time of fetching external characters.

FIG. 5 is a flowchart showing a process flow at the time of fetching external characters.

When external characters are fetched from an external character management file to an external character distribution file, first, initial data entry for fetching external characters is carried out (Step S21). The initial data entry is performed in one of two ways, depending on whether fetching of external characters is requested directly by the external character management apparatus or by some other system via the network. At the time of initial data entry, fetch information including the typeface, size and data format of external characters to be fetched is entered as input information. Further, the name of an external character distribution file in which the fetched external characters are to be stored, the code system of a distributee's system, and a range of character codes to be fetched are specified as the input information. Subsequently, validity of the input information is checked by the user, for example, character strings in the input information entered by the user or sent via the network as a fetch request are checked for accuracy (Step S22). Then, an external character management file to be opened is identified based on the input information (Step S23). This external character management file is identified by the typeface, size and data format input as the fetch information. Then, the external character management file from which external characters are to be fetched is opened (Step S24), and also the external character distribution file in which the fetched external characters are to be stored is opened (Step S25).

Subsequently, a loop process is executed to determine whether or not looping has taken place a number of times equal to the number of characters to be fetched (Step S26). The number of characters to be fetched has been specified by the input information as the range of character codes to be fetched, and therefore, the number of characters to be fetched is determined based on this information. It is then determined whether or not the management code system of the external character management file differs from the code system of the distributee's system (Step S27). If the management code system of the external character management file and the code system of the distributee's system are different from each other, code conversion is performed to acquire a corresponding code in the management code system based on the code system of the distributee's system (Step S28); on the other hand, if the two code systems are the same, the code of the management code system is used as it is. For example, if the management code system is JEF code system whereas the code system of the distributee's system is Shift JIS code system, code conversion is performed because the code systems used are different from each other. In this case, the range of character codes to be fetched has been specified by Shift JIS codes conforming to the code system of the distributee's system; therefore, based on each code in the specified range of character codes expressed in Shift JIS code system, the corresponding code in the management JEF code system is obtained. Then, external character data is fetched from the external character management file (Step S29), and the external character is stored in the external character distribution file by means of a code conforming to the code system of the distributee's system (Step S30).

When the process from Step S26 through to Step S30 has been repeated the number of times equal to the number of characters to be fetched, header information of the external character distribution file is set (Step S31). The header information includes information about the number of stored characters. Since the number of external characters actually fetched from the external character management file differs from the number of characters previously specified by the range of character codes to be fetched, the header information is set after the external characters are actually stored in the external character distribution file. Finally, a termination process, such as closing of the files, is carried out (Step S32).

Figure 6:
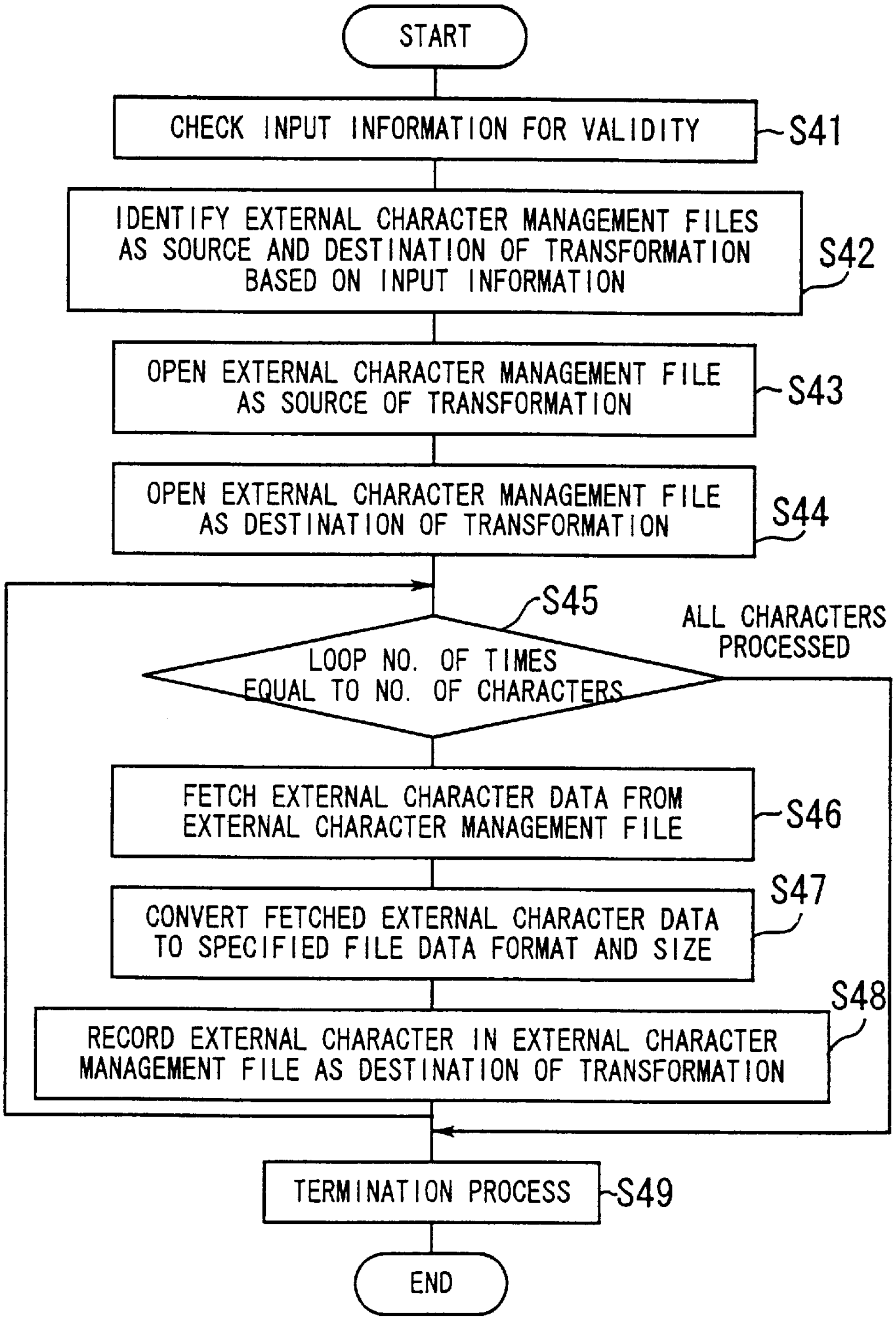
FIG. 6 is a flowchart showing a process flow at the time of transforming external characters.

FIG. 6 is a flowchart showing a process flow at the time of transforming external characters.

When the data format or size of external characters in a certain external character management file is converted to thereby transform the external characters to be saved as a different external character management file, first, fetch information, transformation target information, and a range of character codes to be transformed are specified as input information. For each of the fetch information and the transformation target information, information about the typeface, size and data format of external characters can be specified. As the range of character codes to be transformed, a single character may be specified or a plurality of characters may be specified by means of range setting. Subsequently, the input information is checked for validity, for example, character strings in the input information are checked for accuracy (Step S41). When transformation of external characters is instructed by the user, a method is preferably employed whereby the information about typefaces, sizes and data formats is displayed as character strings in a tree structure on the screen and a character string corresponding to a source of transformation is dragged and dropped on a character string corresponding to a destination of transformation with the pointing device, thereby entering information necessary for the transformation of external characters. Alternatively, the item "Transform" may be selected from a menu, for example, to display a dialog box so that necessary information can be input through the dialog box.

Then, based on the input information, external character management files as the source and destination of transformation, respectively, are identified (Step S42). These external character management files, which are the source and destination of transformation, respectively, are identified by the typefaces, sizes and data formats input as the fetch information and the transformation target information, respectively. Subsequently, the external character management file as the source of transformation is opened (Step S43), and also the external character management file as the destination of transformation is opened (Step S44).

Then, a loop process is executed to determine whether or not looping has taken place a number of times equal to the number of characters to be transformed (Step S45). The number of characters to be transformed has been specified by the input information as the range of character codes to be transformed, and therefore, the number of characters to be transformed is determined based on this information. Then, external character data is fetched from the external character management file as the source of transformation (Step S46), the fetched external character is converted to the specified typeface, size or data format (Step S47), and the converted external character is recorded in the external character management file which is the destination of transformation (Step S48). In the case of transforming external characters, since all management files are managed by means of the same management code system, no code conversion is required. When the process from Step S45 through to Step S48 has been repeated the number of times equal to the number of characters to be transformed, a termination process, such as closing of the files, is executed (Step S49).

Figure 7:
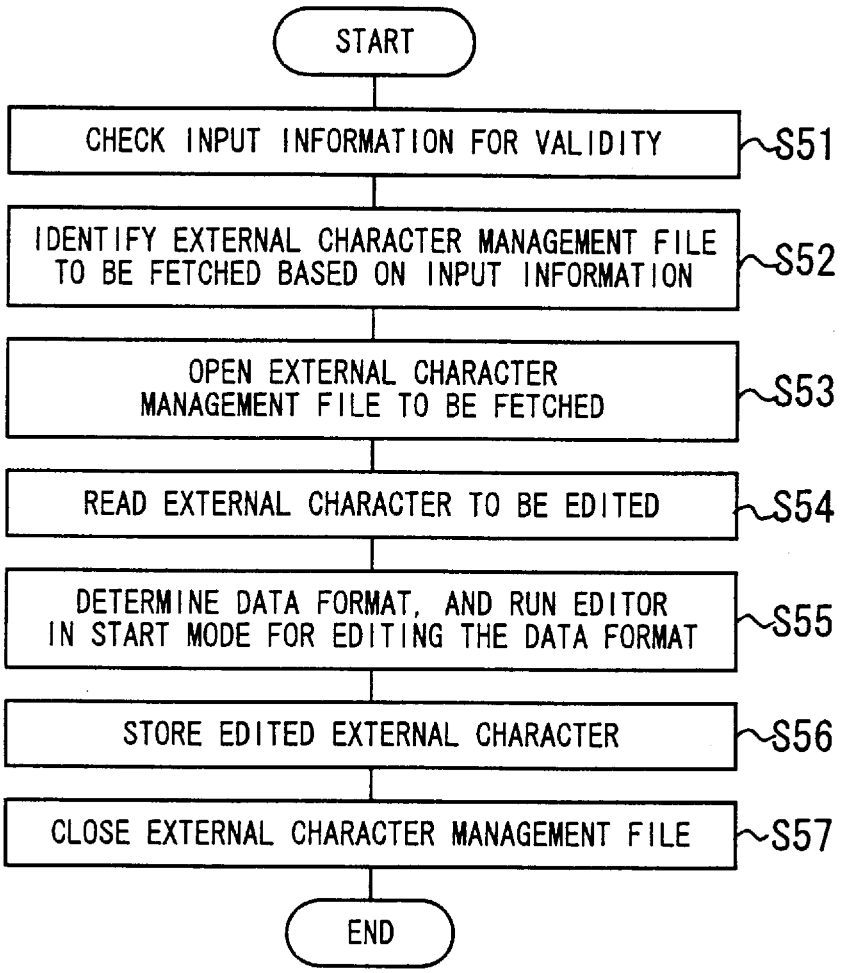
FIG. 7 is a flowchart showing a process flow at the time of editing an external character.

FIG. 7 is a flowchart showing a process flow at the time of editing an external character.

When an external character is edited by the external character editor capable of handling a plurality of different data formats, first, fetch information for specifying an external character management file to be fetched, such as typeface, size and data format, and a character code to be edited are specified as input information. In this case, while external characters are displayed in a tree structure on the screen, for example, a character string indicative of a target external character size is doubled-clicked with the pointing device, whereby information representing this external character is internally specified as fetch information of the input information. Subsequently, the input information is checked for validity (Step S51), and based on the input information, an external character management file to be fetched is identified (Step S52). In the case where external characters are displayed in a tree structure on the screen, when a character string indicative of a target external character size is double-clicked with the pointing device, the external character management file to be fetched can also be internally identified. Then, the identified external character management file to be fetched is opened (Step S53), and an external character to be edited is read (Step S54). At this time, a list of external characters with the specified size is displayed on the screen in order of the code number, for example, and a target external character in the list is double-clicked, whereupon the external character editor is started (Step S55). In this case, the data format of the fetched external character management file is determined, and the external character editor is started and executed in a mode for editing the determined data format. For example, if the data format is vector format, the external character editor is started in the mode for editing in the vector format. When the editing is completed, the edited external character is stored in the original external character management file (Step S56), and the external character management file is closed (Step S57).

Figure 8:
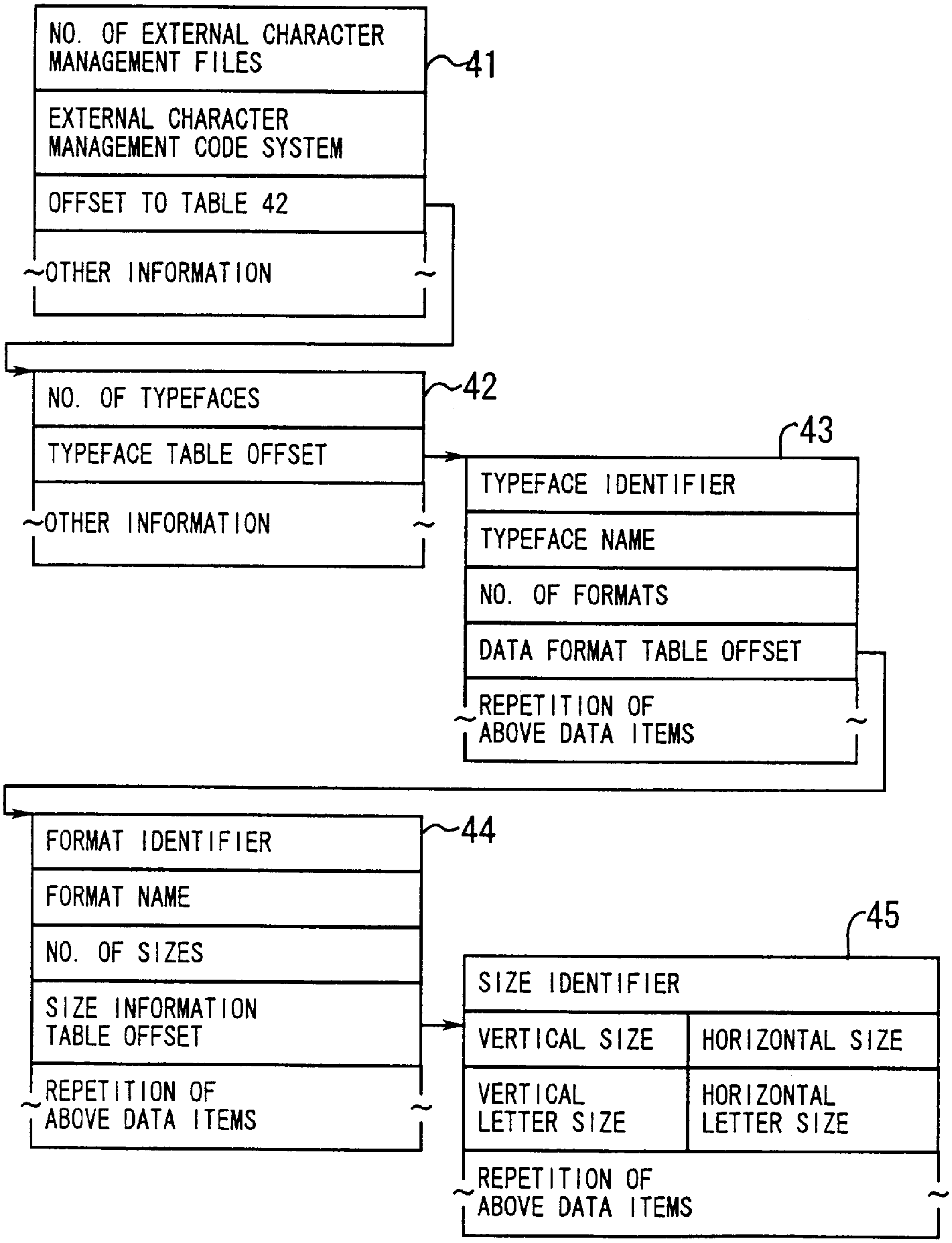
FIG. 8 is a diagram showing a data structure of an external character management database.

FIG. 8 is a diagram showing a data structure of the external character management database.

The external character management apparatus manages the external character management files by means of the external character management database. The external character management database has, for example, a tree structure comprising total management information tables 41 and 42, a typeface table 43, data format tables 44, and size information tables 45.

In the table 41 are set the number of external character management files, the external character management code system, and an offset to the table 42. The number of external character management files represents the number of the external character management files recorded in the external character management file group, and the external character management code system retains character string information on the management code system, for example, JEF code system, which has been preset by the user via the management code system setting means.

In the table 42, the number of typefaces and a typeface table offset are set. For the number of typefaces, “2” is set if two typefaces “Mincho” and “Gothic”, for example, have been recorded.

In the typeface table 43, a group consisting of a typeface identifier, a typeface name, the number of formats and a data format table offset is set for each of the typefaces. In the case of the Mincho typeface, for example, “a0” is set as the typeface identifier, and the character string “Mincho” is set as the typeface name. For the number of formats, “3” is set if there are three data formats, dot-matrix, vector and TrueType, for example.

In the data format table 44, a group consisting of a format identifier, a format name, the number of sizes and a size information table offset is set for each of the data formats. In the case where the data format is dot-matrix format, for example, “b0” is set as the format identifier, “dot” is set as the format name, and the number of the sizes which this format has is set as the number of sizes.

In the size information table 45, a group consisting of a size identifier, a vertical size, a horizontal size, a vertical letter size and a horizontal letter size is set for each of the sizes. In the case where the vertical size by the horizontal size is “30×30” and the vertical letter size by the horizontal letter size is “28×28”, for example, “c0” is set as the size identifier. For other sizes, “c1”, . . . are set.

The typeface identifiers in the typeface table 43, the format identifiers in the data format tables 44, and the size identifiers in the size information tables 45 are used as filename information to identify external character management files. For example, the filename “a0b0c0” represents an external character management file which holds data of the Mincho external characters of dot-matrix format with the size “30×30 (28×28)”. When the recorded external characters are displayed in a tree structure on the screen, the typeface name “Mincho”, the format name “dot”, and the size “30×30 (28×28)” are shown.

Figure 9:
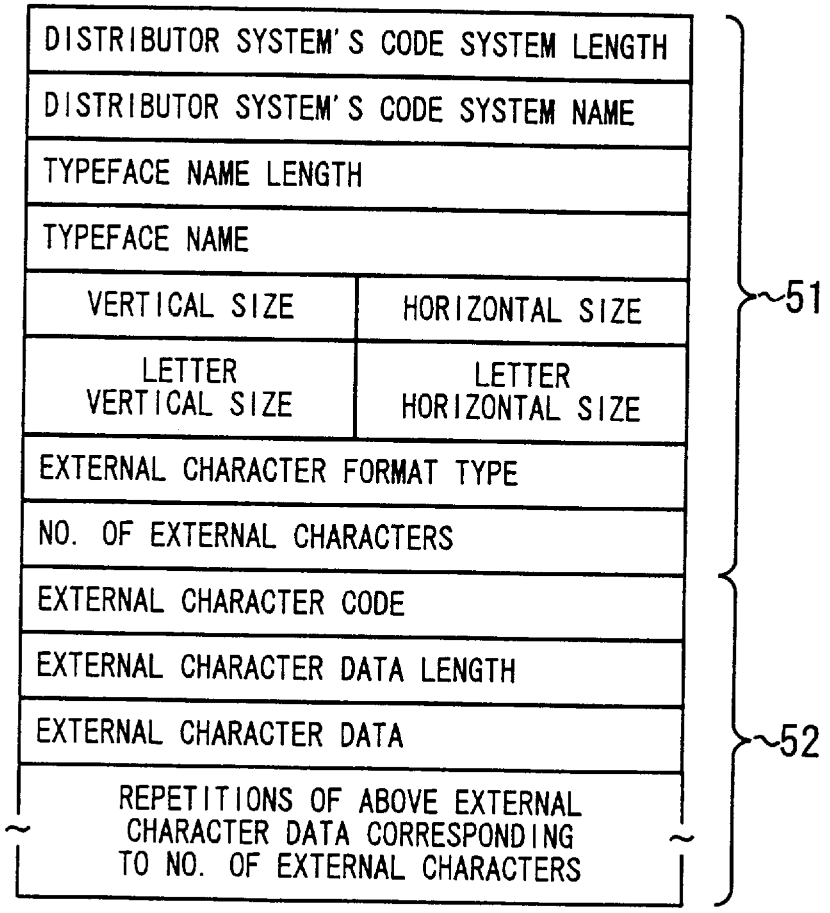
FIG. 9 is a diagram showing a data structure of an external character distribution file.

FIG. 9 is a diagram showing a data structure of the external character distribution file.

The external character distribution file which is to be distributed comprises a header information section 51 and an external character data section 52. The header information section 51 includes information about a distributor system’s code system length, a distributor system’s code system name, a typeface name length, a typeface name, vertical size-horizontal size, letter vertical size-letter horizontal size, an external character format type, and the number of external characters. The external character data section 52 is made up of groups associated with respective external character codes, each group consisting of an external character code, an external character data length and external character data.

In the case where the code system of the distributor’s system is JEF, for example, the distributor system’s code system length in the header information section 51 is “3” because JEF is made of up of three one-byte characters, and the distributor system’s code system name is “JEF”. In the case of the typeface Mincho, the typeface name length is “4” because Mincho, when written in Kanji, is made up of two two-byte characters (corresponding to four one-byte characters), and the typeface name is “Mincho” (in Kanji characters). For the external character format type, format information representing dot-matrix, vector or TrueType is entered. The number of external characters indicates the number of the external characters stored in the external character data section 52.

In the embodiment described above, the external character management apparatus according to the present invention is applied to processing of Kanji characters used in Japan, but may be applied to processing of other characters. For example, the present invention can be applied to a 7/8-bit character system (e.g., ISO/IEC 646:1991, ANSI X 3.4-1986

(ASCII)) or a character code system (e.g., UCS-2 of ISO/IEC 10646–11993) in which 16 bits or more are used to represent one character.

As described above, the present invention comprises the external character recording means, the external character management file storing means, the external character fetching means, the data format converting means, the code converting means, the external character transforming means, and the external character editing means.

Accordingly, once the user sets a particular code system as the external character management code system, when external characters are input or output through the code converting means capable of converting external character codes, they can be converted to the management code system or to the code system used in a system to which the external characters are to be output, whereby external characters of multiple systems can be integrated and collectively managed by means of the management code system. The data format converting means can perform conversion between a plurality of different external character data formats, and accordingly, when external characters are generated through transformation, the quality of the transformed external characters can be confirmed on the system. Unlike in conventional systems, therefore, transformed external characters need not be printed or displayed by way of trial on each system so as to permit the quality of the transformed external characters to be confirmed, thus saving the labor of confirmation on the distributee's side.

Also, the external character editing means capable of handling a plurality of different external character data formats is provided. Therefore, external characters can be edited concentratedly, and it is not necessary to master operating external character editors of individual systems or to edit external characters by using different external character editors, thus saving labor associated with generation of external characters.

Further, in the distributed system, since the labor associated with confirmation of external character quality and the labor associated with editing of external characters are lessened, changes in the external character environment can be quickly coped with and the system operation rate can be improved.

Advantages similar to those described above can be achieved even in the case where no management code system is set and the external character management files are managed by means of the code systems of individual systems so that, when external characters are transformed, not only the data format and size but also character codes may be converted. In this case, however, identical data formats for different systems are treated as different data formats.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An external character management apparatus connected to a distributed system via a network, the distributed system including a plurality of computer systems interconnected via the network and using different sizes of characters and different character codes assigned to respective characters, the external character management apparatus comprising:

external character recording means for reading an external character stored in a distributor's external character file and recording the external character;

external character management file storing means for storing in an external character management file the external character recorded by said external character recording means;

external character fetching means for fetching an external character stored in said external character management file storing means, and storing the fetched external character in a distributee's external character file;

code converting means, having a character code conversion table and associated with said external character recording means or said external character fetching means, for performing conversion of an external character code in accordance with the character code conversion table when a different code system is used in a distributor's system or distributee's system;

code conversion table updating means for updating the character code conversion table in accordance with a code system for management;

external character transforming means for fetching an external character stored in said external character management file storing means, converting the fetched external character to an external character of a different data format or different size, and storing the converted external character in said external character management file storing means;

data format converting means for performing the conversion of data format or size of the external character when transformation process is executed by said external character transforming means; and external character editing means for editing an external character recorded in said external character management file storing means.

2. The external character management apparatus according to claim 1, which further comprises management code system setting means for setting a desired code system, which a user considers to be effective in managing external characters, as a management code system for external character management files recorded in said external character management file storing means.

3. An external character management method for managing external characters in a distributed system, the distributed system including a plurality of computer systems interconnected via a network and using different sizes of characters and different character codes assigned to respective characters, the external character management method comprising the steps of:

specifying a particular code system in advance as a management code system to thereby permit concentrated management at a single location; and converting an external character code of a code system used in a distributor's system to an external character code of the management code system when the code system of the distributor's system differs from the management code system, or converting an external character code of the management code system to an external character code of a code system used in a distributee's system for distribution when the code system of the distributee's system differs from the management code system.

4. A computer-readable medium storing a computer program executed by a central processing unit, said computer program including instructions for performing:

a process of reading an external character stored in a distributor's external character file, converting the read external character to an external character code of a management code system if a code system of the read external character differs from the management code system, and recording the read or converted external character;

an external character fetching process of fetching a recorded external character, converting the fetched external character to an external character code of a code system used in a distributee's system if the code system of the distributee's system differs from the management code system, and storing the fetched or converted external character in a distributee's external character file;

a transforming process of reading the recorded external character, converting the read external character to an external character of a different data format or different size, and recording the converted external character as a separate character; and an editing process of editing the recorded external character.

5. A computer-readable medium storing a computer program for operating a general-purpose computer as an external character management apparatus said computer program comprising:

external character recording means for reading an external character stored in a distributor's external character file and recording the external character;

external character management file storing means for storing in an external character management file the external character recorded by the external character recording means;

external character fetching means for fetching an external character stored in the external character management file storing means, and storing the fetched external character in a distributee's external character file;

code converting means, associated with the external character recording means or the external character fetching means, for performing conversion of an external character code when a code system used in a distributor's system or distributee's system differs from a management code system;

external character transforming means for fetching an external character stored in the external character management file storing means, converting the fetched external character to an external character of a different data format or different size, and storing the converted external character in the external character management file storing means;

data format converting means for performing the conversion of data format or size of the external character when transformation process is executed by the external character transforming means; and external character editing means for editing an external character recorded in the external character management file storing means.

6. A computer program stored in a general-purpose computer and operating the general-purpose computer as an external character management apparatus, comprising:

external character recording means for reading an external character stored in a distributor's external character file and recording the external character;

external character management file storing means for storing in an external character management file the external character recorded by the external character recording means;

external character fetching means for fetching an external character stored in the external character management file storing means, and storing the fetched external character in a distributee's external character file;

code converting means, associated with the external character recording means or the external character fetching means, for performing conversion of an external character code when a code system used in a distributor's system or distributee's system differs from a management code system;

external character transforming means for fetching an external character stored in the external character management file storing means, converting the fetched external character to an external character of a different data format or different size, and storing the converted external character in the external character management file storing means;

data format converting means for performing the conversion of data format or size of the external character when transformation process is executed by the external character transforming means; and external character editing means for editing an external character recorded in the external character management file storing means.

7. A method of managing an apparatus connected to a distributed system, comprising the steps of:

converting an external character to an external code used in a management system when the external character code differs from the management system code; and converting an external character to an external character code used in a distributees system when the distributees system code differs from a code system of the management system.

* * * * *